United States Patent [19]

Byrd et al.

[11] Patent Number: 4,715,244

[45] Date of Patent: Dec. 29, 1987

[54] SELF-SCAVENGING GEAR BOX LUBRICATION SYSTEM

[75] Inventors: William A. Byrd, Rockford; Anthony R. Smith, Roscoe, both of Ill.

[73] Assignee: Sundstrand Corporation, Rockford, Ill.

[21] Appl. No.: 886,346

[22] Filed: Jul. 17, 1986

[51] Int. Cl.$^4$ .................... F01M 9/10; F16H 57/04
[52] U.S. Cl. ......................... 74/467; 184/6.12
[58] Field of Search ................... 74/467; 184/6.12

[56] References Cited

U.S. PATENT DOCUMENTS

| | | | |
|---|---|---|---|
| 1,220,810 | 3/1917 | Alquist | 74/467 |
| 1,357,301 | 11/1920 | Reaugh | 184/11.1 |
| 1,610,886 | 12/1926 | Ross | 184/6.12 |
| 2,235,793 | 3/1941 | Berger | 184/6 |
| 2,386,367 | 10/1945 | Taylor | 74/410 |
| 2,565,203 | 8/1951 | Churchill | 74/467 |
| 2,762,232 | 9/1956 | Bade | 74/421 |
| 2,822,705 | 2/1958 | Orr et al. | 74/695 |
| 3,029,661 | 4/1962 | Schmitter | 74/606 |
| 3,121,474 | 2/1964 | Matt | 184/6.12 |
| 3,146,629 | 9/1964 | Schmitter | 74/410 |
| 3,529,698 | 5/1967 | Nelson | 184/6.12 |
| 4,068,740 | 1/1978 | Quinn et al. | 184/6 |
| 4,217,794 | 8/1980 | Yasui et al. | 74/700 |
| 4,222,283 | 9/1980 | Nagy | 74/467 |
| 4,231,266 | 11/1980 | Nishikawa et al. | 74/467 |
| 4,355,542 | 10/1982 | Tsutsumi et al. | 74/467 |
| 4,359,909 | 11/1982 | Sogo | 74/467 |
| 4,368,802 | 1/1983 | Grabill et al. | 184/6 |
| 4,429,587 | 2/1984 | Finn, III et al. | 74/467 |
| 4,612,818 | 9/1986 | Hori et al. | 74/467 |
| 4,630,711 | 12/1986 | Levrai et al. | 184/6.12 |

Primary Examiner—Leslie A. Braun
Assistant Examiner—Joseph J. Meter
Attorney, Agent, or Firm—Wood, Dalton, Phillips, Mason & Rowe

[57] ABSTRACT

A self-scavenging gear box lubrication system is disclosed and includes a gear box housing having at least one gear chamber providing relatively close confirmation with meshing gears rotatably mounted in the chamber. Lubricating fluid is delivered to the chamber for lubricating and cooling the gears. At least one collecting cavity for the lubricating fluid is provided in the housing separate from the gear chamber. A passage communicates between the gear chamber and the collecting cavity for passing fluid from the chamber to the cavity under the influence of centrifugal action effected by rotation of the meshing gears, whereby the fluid can be scavenged from the cavity by an appropriate lubrication pump. The passage is oriented generally tangentially of at least one of the meshing gears, and the passage is of restricted dimensions to provide a positive inlet presure to prevent backflow from the collecting cavity into the gear chamber at all attitudes.

17 Claims, 6 Drawing Figures

SELF-SCAVENGING GEAR BOX LUBRICATION SYSTEM

FIELD OF THE INVENTION

This invention relates to lubricating systems and particularly to a gear box lubricating system which is self-scavenging.

BACKGROUND OF THE INVENTION

In many power transmission systems, such as gear train systems, continued lubrication is essential to proper operation. The lubrication system must provide a continual supply of lubricant to the moving surfaces, such as the meshing gears, and must perform a cooling effect.

Conventionally, the lubricant is scavenged from the housing or gear box of the power transmission system or gear train and recirculated through a sump to appropriate recirculating pump means. The recirculation circuit may or may not include a filter and the cooling lubricant is returned to the gear box to provide a continuous supply of a cooling medium.

In order to scavenge the lubricant from the gear box, separate scavenge pumps often are employed. In simple power transmissions or gear train systems, separate scavenge pumps have proven quite adequate. However, in more complicated power transmission systems, multiple scavenge pumps must be used to adequately perform the cooling function. When simplicity and weight are important design factors, multiple scavenge pumps have proven either inadequate or undesirable.

For instance, multiple load path transmissions have long been favored for any of a variety of reasons. A typical one of such transmissions includes a rotary input element and a rotary output element. Typically, two or more, substantially identical, gear trains individually connect the input element and the output element. Therefore, the energy or power being transmitted from the input to the output is nominally divided by the number of gear trains interconnecting the two.

Typical advantages flowing from such a construction include the ability to use gears of a lesser face width than would otherwise be required, the use of smaller bearings, the use of lesser material with commensurate weight reduction, and the like. In addition, multiple path transmissions frequently are less noisy during operation than single path transmissions. An example of the use of such multiple load path power transmissions is disclosed herein in conjunction with a turbine for a torpedo or the like.

However, the advantages that may be obtained through the use of a multiple load path transmission are not unaccompanied by disadvantages. One such disadvantage is the circuitous surface areas of such a transmission system which must be continuously lubricated for proper operation. Scavenging the lubricant from such a system, such as the gear box of a multiple load path transmission, can become complicated. Where the multiple load path transmission is used primarily or in part for weight reduction reasons, multiple scavenging pumps defeats the very design parameters for using such a transmission system in the first place. Further problems with such transmission systems are caused in applications where the apparatus itself may attain various attitudes.

This invention is directed to solving one or more of the above problems by providing a unique self-scavenging lubrication system which totally eliminates the necessity of multiple scavenging pumps or other such scavenging apparatus.

SUMMARY OF THE INVENTION

An object, therefore, of the invention is to provide a new and improved lubricant scavenging system and, particularly, to a self-scavenging lubrication system for power transmissions, gear trains or the like.

In the exemplary embodiment of the invention, the self-scavenging lubrication system is illustrated as embodied in the gear box of a multiple load path power transmission. A gear box housing has a gear chamber providing relatively close conformation with meshing gears rotatably mounted in the chamber. Means are provided for delivering lubricating fluid to the chamber from an appropriate lubrication supply network. At least one lubricating fluid collecting cavity is provided in the housing separate from the gear chamber. Passage means communicate between the gear chamber and the collecting cavity for passing fluid from the chamber to the cavity under the influence of centrifugal action effected by rotation of the gears whereby the fluid can be scavenged from the cavity by appropriate lubrication pump means.

As disclosed herein, the passage means are oriented generally tangentially of the meshing gears. The passage means are of restricted dimensions to provide a positive inlet pressure to prevent backflow from the collecting cavity into the gear chamber at all attitudes. In essence, the restricted passage means creates a velocity head which is converted to a pressure head to prevent backflow. Stripper means are provided at the entrance to the passage means from the gear chamber for directing the lubricating fluid from the chamber into the passage means as the fluid is forced outwardly under the centrifugal action of the rotating gears.

With the multiple load path transmission disclosed herein, a plurality of collecting cavities are disposed in the housing angularly about the gear chamber. The cavities, in essence, substantially surround the gear chamber. There is at least one cavity on each opposite side of the gear chamber. Fluid conduit means communicate between the collecting cavities. In the exemplary embodiment of the invention, the conduit means include a plurality of conduits to prevent one cavity from becoming dry relative to another cavity. Preferably, the conduits all lead to a single cavity from which the fluid or lubricating coolant can be scavenged by appropriate pump means to supply the lubrication circuit.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBOIDMENT

Figure 1:
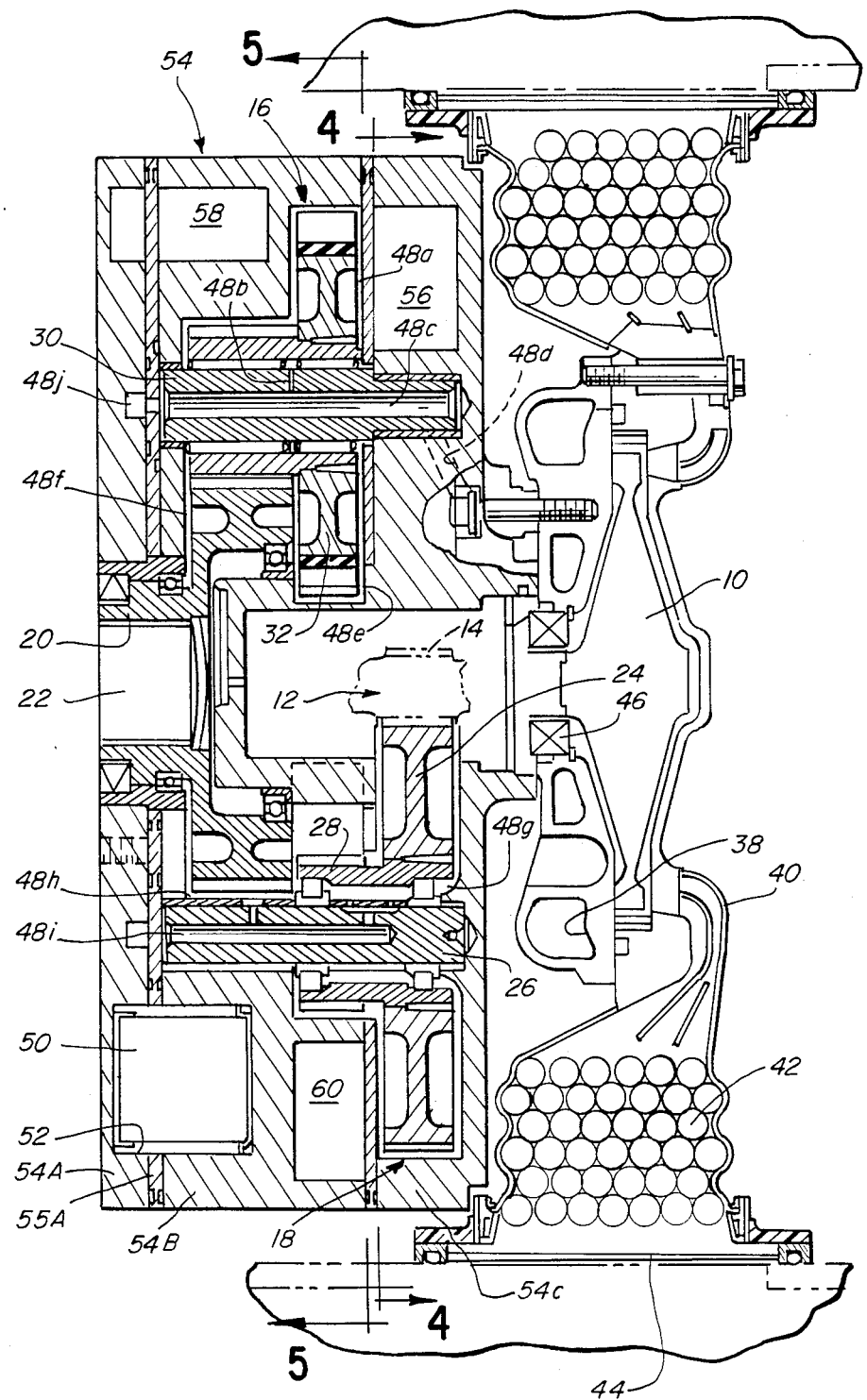
FIG. 1 is a sectional view of a multiple load path transmission in connection with a turbine drive of the sort that may be utilized in an underwater propulsion system, and incorporating the self-scavenging lubrication system of the invention.

An exemplary embodiment of a power transmission, particularly a multiple load path transmission, embodying the self-scavenging gear box lubrication system of the invention is illustrated in FIG. 1 in connection with a turbine wheel 10. The turbine wheel is part of a turbine drive for an underwater propulsion system, such as a torpedo. Turbine wheel 10 drives an input shaft shown in phantom, as at 12. First and second gear trains, generally designated 16 and 18, are generally identical in configuration and connect an input gear 14 and a relatively large output gear 20 which drives an output shaft 22.

In the embodiment illustrated, the transmission provides for a triple speed reduction. Thus, each of the gear trains 16 and 18 includes a first reduction stage comprised of a relatively large gear 24 (only one visible in FIG. 1) meshed with input gear 14. Gears 24 are rotatable about axes defined by associated shafts 26. Also journalled on shafts 26 are first relatively small gears 28 in each gear train 16 and 18 which serve as part of second reduction stages. Second shafts 30, which are parallel to shafts 12,22 and 26, journal force equalizing gears 32 of relatively large size and which are meshed with corresponding ones of the small gears 28. Journalled for rotation about the axis defined by the shafts 30 in unison with gears 32 are relatively small gears 34 which are meshed with output gear 20, which it will be recalled, is relatively large. Thus, gears 34 and gear 20 define the third reduction stages.

Turbine wheel 10 is seen to be an axial flow turbine receiving a pressurized fluid from a manifold 38. The pressurized fluid may be, for example, steam, when the turbine forms part of an underwater propulsion system such as a torpedo. The fluid passing through turbine wheel 10 is directed by an exhaust baffle 40 through a heat exchanger 42 comprised of a plurality of tubes which may be utilized as a regenerator in a closed cycle system. From regenerator 42, the steam is passed through an outlet 44 to a condenser or the like. The turbine wheel shaft 12 is journalled by bearings 46 within the housing components.

A lubricant or cooling fluid is continuously supplied to the transmission described above and will flow around, through and/or between the various gears, shafts, bearings or the like described above. For instance, some of these areas are defined by the spaces, channels or the like identified by the numerals 48a through 48i in FIG. 1. The lubricant supply conduit means is not visible in FIG. 1. However, a filter 50 is illustrated in a compartment 52 within housing 54 and which is part of the lubrication network or circuit, as described hereinafter.

The self-scavenging lubrication system of the invention is best illustrated in FIGS. 2-5. However, FIG. 1 does show portions of a plurality of collecting cavities 56,58 and 60 in a housing, generally designated 54 and including housing portions 54A,54B and 54C. Plates 55A and 55B are disposed between the housing portions as seen in FIG. 1. Suffice it to say at this point, the scavenged lubricant eventually is channelled to collecting cavity 60 whereupon it is scavenged by appropriate lubrication pump means to supply the circuit described hereinafter.

Figure 2:
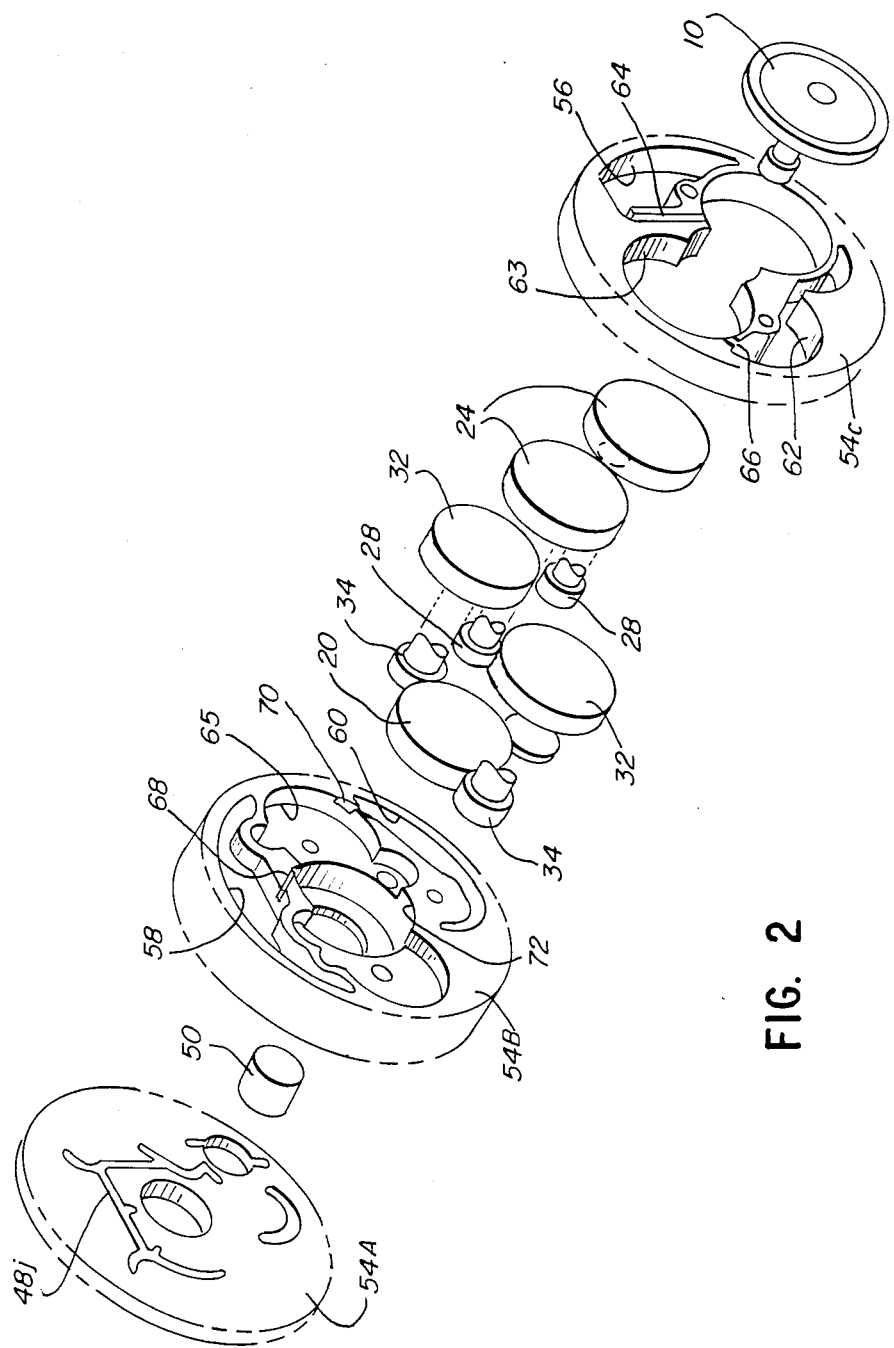
FIG. 2 is an exploded, perspective view of the gear train components and certain housing portions defining the scavenge cavities.

FIG. 2 shows an exploded perspective view of housing portions 54A-54C in relation to turbine 10 and the triple speed reduction gear train or transmission described above in relation to FIG. 1, including gears 20,24,28,32 and 34. The location of collecting cavities 58 and 60 in housing portion 54B also is illustrated. It can be seen that these cavities 58 and 60 generally are located above and below, respectively, the transmission area, which also is illustrated in FIG. 1. A fourth collecting cavity 62 is located in housing portion 54C on the side thereof opposite collecting cavity 56. Cavities 56,62 can be seen to be located generally on opposite sides of the transmission area. Therefore, collecting cavities 56,58,60 and 62 substantially surround the transmission area defined by the enumerated gears. The gears are located in closely conforming gear chambers 63 in housing portion 54C and 65 in housing portion 54B. In essence, these gear chambers in the two housing portions form a composite gear chamber for the transmission.

Figure 3:
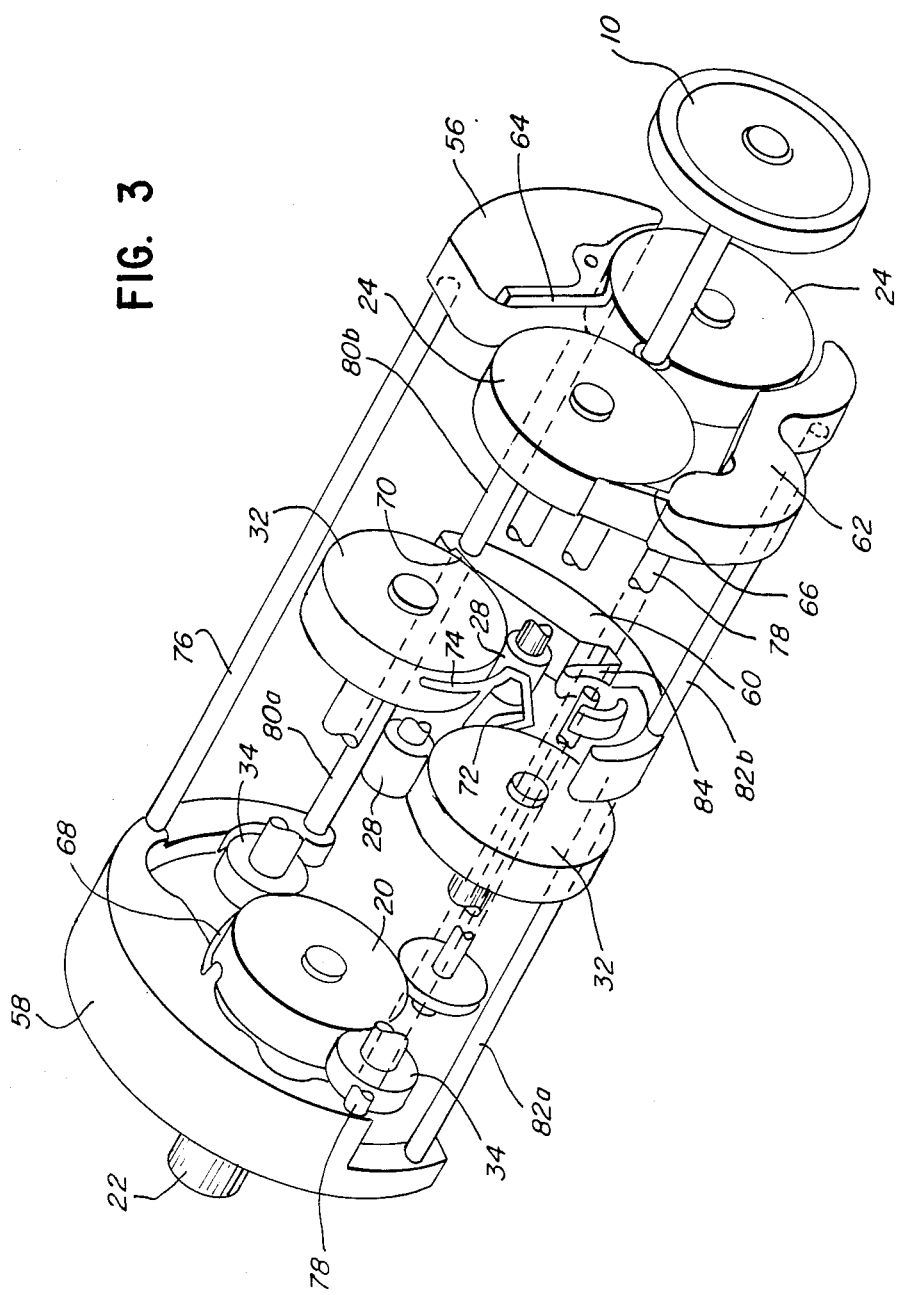
FIG. 3 is a somewhat schematic, exploded perspective view depicting the various gears, scavenge cavities, passage means and conduit means in accordance with the concepts of the invention.

FIG. 3 is a somewhat unusual drawing which is being used to better illustrate the relationship of the transmission gears and the collecting cavities. Specifically, the gears are shown somewhat schematically as solid circular bodies with the reference numerals 20,24, 28,32 and 34 applied thereto as described in relation to FIGS. 1 and 2. However, cavities 56,58,60 and 62 are shown as enclosed compartments when, in fact, as described in relation to FIGS. 1 and 2, the cavities are spaces formed within housing portions 54B and 54C. This depiction of the cavities in FIG. 3 is being used to facilitate a better understanding of the operation of the invention. More particularly, passage means are provided between the gear chambers 63 and 65 and the collecting cavities 56-62 for passing the lubricating fluid from the respective gear chambers to the respective collecting cavities under the influence of centrifugal action effected by rotation of the gears in the respective gear chambers whereby the fluid can be scavenged therefrom.

Specifically referring to both FIGS. 2 and 3, a passage 64 is provided in housing portion 54C for directing fluid from lower gear 24 into collecting chamber 56. A passage 66 is provided in housing portion 54C for directing fluid from upper gear 24 into collecting chamber 62. A passage 68 is provided in housing portion 54B for delivering fluid from gear 20 to collecting cavity 58. A passage 70 is provided in housing portion 54B for delivering fluid from the rear gear 32 (as viewed in FIGS. 2 and 3) to collecting chamber 60. There is no separate passage for front gear 32 communicating with collecting cavity 60. Instead, an enlarged portion 72 of gear chamber 65 (FIG. 2) directs fluid onto rear gear 32, as at 74 in FIG. 3, which, in turn, directs the fluid through passage 70 into collecting chamber 60 as described above.

It can be seen in FIGS. 2 and 3 that each of passages 64–74 are oriented tangentially of the respective meshing gears and are located at the peripheries of the gear chamber. Therefore, the fluid is directed to the respective collecting cavities under the influence of centrifugal action effected by rotation of the respective gears without any accessory pump means or other appartus.

It also can be seen in FIGS. 2 and 3 that passages 64–74 have restricted dimensions such that the coolant or lubricant cannot flow back into the respective gear chambers when the gears rotate. Not only is backflow prevented, but a positive pressure is created whereby the system is attitude insensitive. In other words, the dynamic head created by the centrifugal force of the liquid into and through the passages is greater than the static head of liquid within the gear box. The velocity of the liquid passing through the passages, in essence, is converted to a pressure or dynamic head. Lastly, as seen best in FIGS. 4 and 5, and as described hereinafter, stripper means are provided at the entrance of the passages for facilitating directing the lubricating fluid from the gear chamber into the respective passage.

FIG. 3 also shows conduit means interconnecting collecting cavities 56,58,60 and 62 whereby the lubricating fluid directed thereinto under the centrifugal action of the gears is channelled to a single collecting chamber, namely collecting chamber 60, for scavenging therefrom by appropriate lubrication pump means. More particularly, FIG. 3 shows the conduit means in the form of conduits 76,78 80a,80b, and 82a,82b. It can be seen that conduits 76 and 78 interconnect the tops of collecting cavities 56,62 with collecting cavity 58 generally at the top thereof. Conduits 80a and 82a interconnect the bottom of collecting cavity 58 with center collecting cavity 60. Conduits 80b and 82b interconnect the bottoms of collecting cavities 56 and 62, respectively, with collecting cavity 60. Therefore, it can be seen that all of the collecting cavities are interconnected with a single collecting cavity, namely collecting cavity 60. The lubricating fluid is scavenged from collecting cavity 60 through a lubrication pump outlet schematically shown at 84 which leads to an appropriate lubrication pump means.

Figure 4:
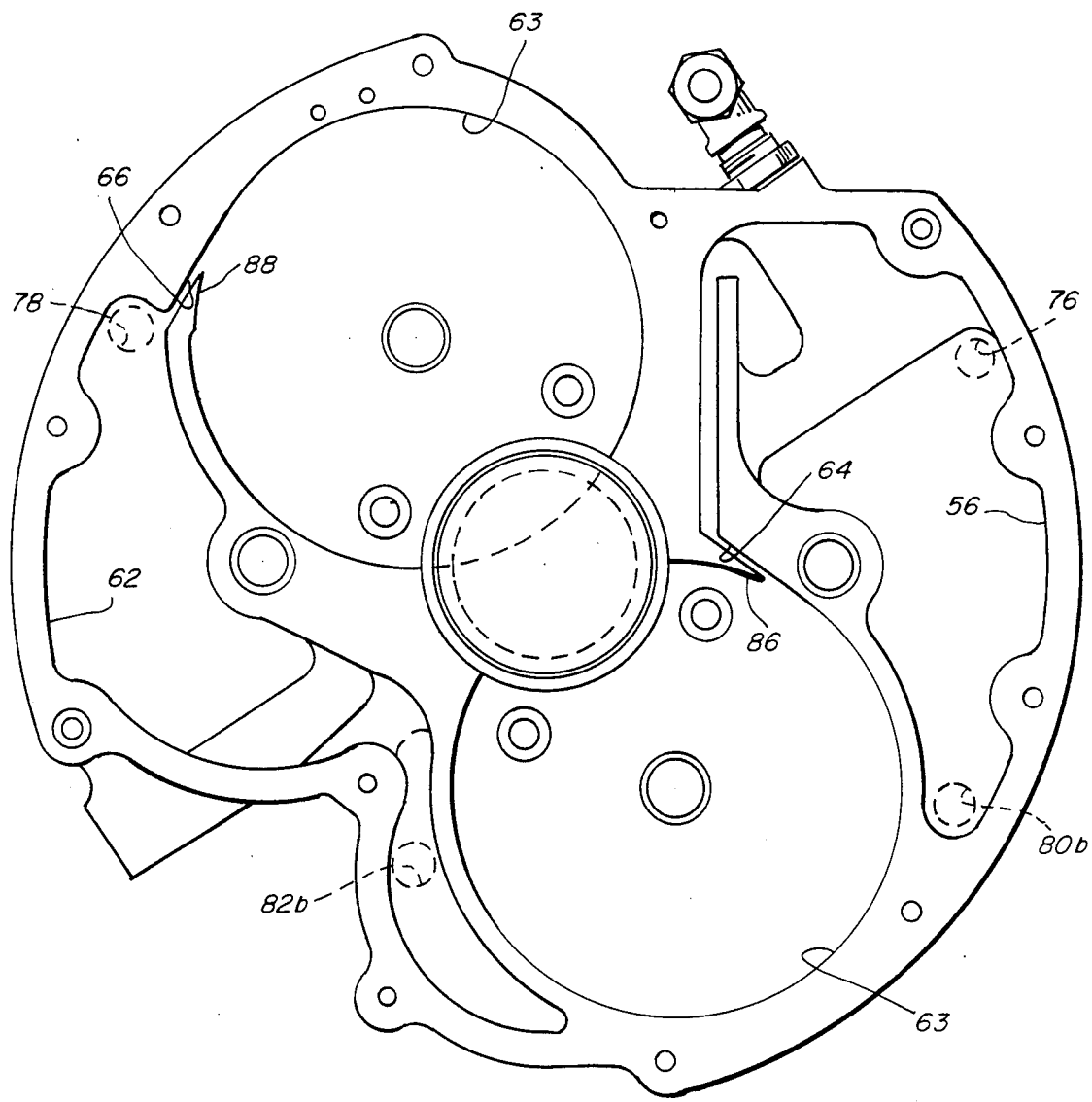
FIG. 4 is an enlarged view taken generally in the direction of line 4—4 of FIG. 1.
Figure 5:
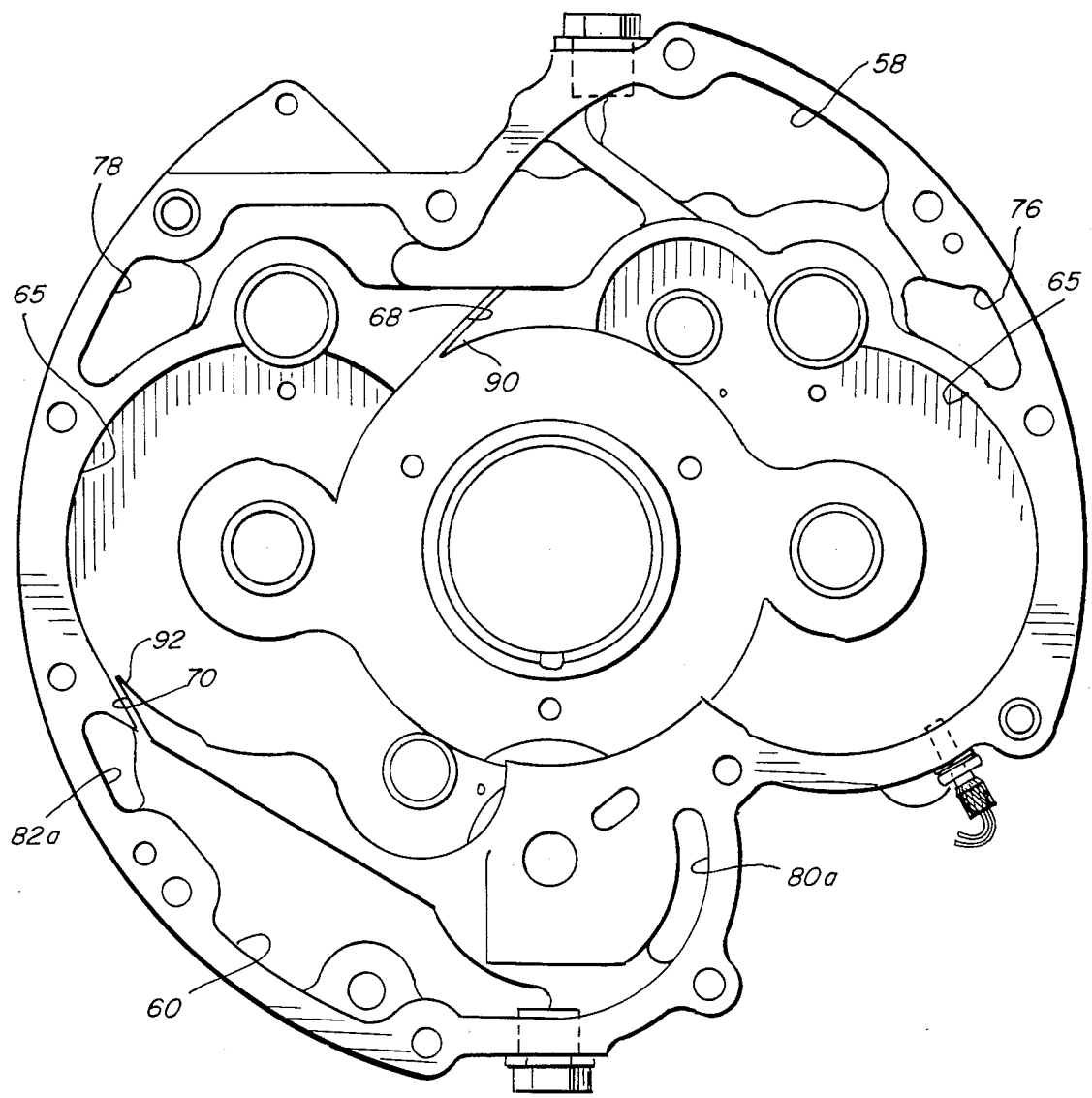
FIG. 5 is an enlarged view taken generally in direction of line 5—5 of FIG. 1.

It is important to understand that FIG. 3 shows conduits 76,78,80a,80b,82a and 82b as elongated tubes when, in fact, the conduits simply comprise apertures or holes in plates 55A and 55B (FIG. 1) between housing portions 54A,54B and 54C, and as will be seen somewhat in FIGS. 4 and 5. The conduits are shown as tubes in FIG. 3 simply to facilitate a schematic illustration of the interconnection between the collecting cavities in an exploded perspective view. It also can be seen in FIG. 3 that conduits 76–82b are spaced angularly about the gear transmission area and about the gear chamber. This arrangement is provided so that no single one collecting chamber can become "dry". As is known, a pump will draw less viscous or less dense air from a dry chamber when interconnected with a chamber that contains liquid such as a lubricant, because of the obvious difference in resistance. Therefore, with the invention, the conduits interconnect the collecting cavities at upper, lower and side locations to prevent such starving or choking of the system.

FIG. 4 shows an elevational view of the left-hand side of housing portion 54C as viewed in FIG. 1. The relative locations of collecting cavities 56 and 62 can be seen in relation to gear chamber 63. It also can be seen how passages 64 and 66 are oriented tangentially of the gear chamber (and the meshing gears), as well as their restricted dimensions to prevent backflow. As stated above, stripper means are provided at the entrances to the passages from the respective gear chambers for facilitating directing the lubricating fluid from the chambers into the passages under centrifugal action. This stripper means is shown at 86 defining the entrance to passage 64 and at 88 defining the entrance to passage 66. Lastly, the interconnecting conduits 76,78,80b and 82b are shown by dotted lines.

FIG. 5 shows an elevational view of the right-hand side of housing portion 54B as viewed in FIG. 1. The relative positioning of collecting cavities 58 and 60 with respect to gear chamber 65 can be seen best in this view. It also can be seen how passages 68 and 70 extend tangentially of the gear chamber at their respective locations, as well as the restricted dimensions of the passages. Again, stripper means 90 is provided at the entrance to passage 68. Stripper means 92 is provided for passage 70. The location of interconnecting conduits 58,78,80a and 82a also can be seen.

From the foregoing, it can be seen that a self-scavenging gear box lubrication system has been provided without requiring multiple scavenging pumps as is prevalent with the prior art. The collecting cavities are self-contained within the transmission housing and are fed under the influence of centrifugal action effected by rotation of the gears. The manner in which the collecting cavities are interconnected prevent any single cavity from becoming "dry"; the system is attitude insensitive; and the lubricating fluid can be scavenged from a single collecting cavity.

Figure 6:
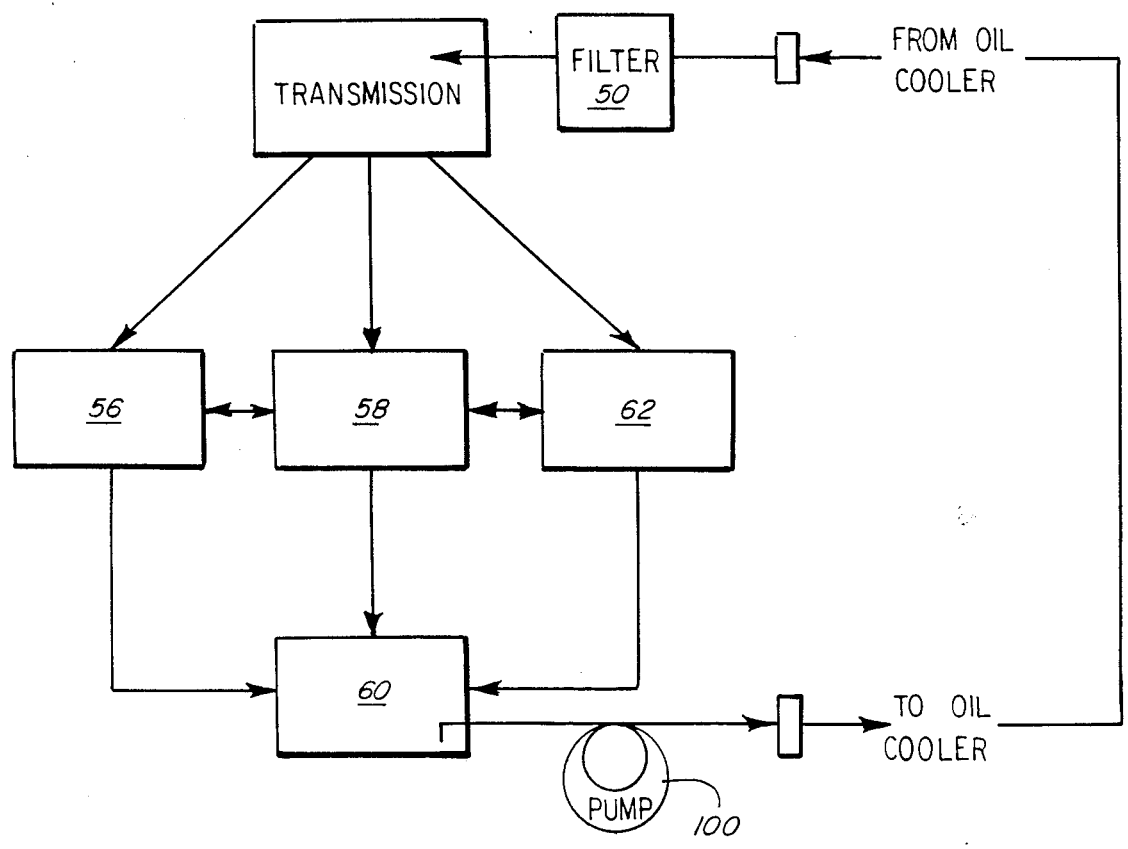
FIG. 6 is a schematic diagram of a simple lubrication circuit for use with the invention.

Lastly, FIG. 6 shows a simple lubrication circuit including a pump means 100 for scavenging the lubricating fluid from collecting cavity 60, as well as the interconnection between all of the collecting cavities 56-62.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A self-scavenging gear box lubrication system, comprising:
   gear box housing means having at least one gear chamber therein providing close conformation with at least two meshing gears rotatably mounted in the chamber;
   means for delivering lubricating fluid to the chamber;
   at least one lubricating fluid collecting cavity in the housing means separate from, coplanar with and radially spaced from the gear chamber; and
   passage means between the gears chamber and the collecting cavity and oriented generally coplanar with and tangentially of at least one of the meshing gears for passing fluid from the chamber to the cavity under the influence of centrifugal action effected by rotation of the gear teeth whereby the fluid can be scavenged from the cavity by appropriate lubrication pump means, said passage means being of restricted dimensions to provide a positive inlet pressure to prevent backflow from the collecting cavity into the gear chamber at all attitudes.

2. The self-scavenging gear box lubrication system of claim 1, including stripper means at the entrance to the passage means from the gear chamber for directing the lubricating fluid from the chamber into the passage means.

3. The self-scavenging gear box lubrication system of claim 1, including a plurality of said collecting cavities disposed angularly about the gear chamber.

4. The self-scavenging gear box lubrication system of claim 3 wherein said collecting cavities substantially surround the gear chamber.

5. The self-scavenging gear box lubrication system of claims 3 or 4, including fluid conduit means interconnecting at least some of the collecting cavities.

6. The self-scavenging gear box lubrication system of claim 5 wherein said conduit means include a plurality of conduits spaced angularly about the gear chamber.

7. The self-scavenging gear box lubrication system of claims 1 or 3, including at least one collecting cavity on each opposite side of the gear chamber.

8. The self-scavenging gear box lubrication system of claim 7, including fluid conduit means interconnecting at least some of the collecting cavities.

9. The self-scavenging gear box lubrication system of claims 3 or 4, including fluid conduit means connecting all the collecting cavities whereby the pump means can be connected to only one of said cavities.

10. A self-scavenging gear box lubrication system, comprising:
    gear box housing means having at least one gear chamber therein providing close conformation with at least two meshing gears rotatably mounted in the chamber;
    means for delivering lubricating fluid to the chamber;
    a plurality of lubricating fluid collecting cavities in the housing means, the collecting cavities being separate from, coplanar with and radially spaced from the gear chamber and being spaced angularly thereabout; and
    passage means between the gear chamber and each respective collecting cavity, the passage means being located at the periphery of the gear chamber and oriented generally coplanar with and tangentially of the respective meshing gears for passing fluid from the chamber to the respective collecting cavity under the influence of centrifugal action effected by rotation of the gear teeth whereby the fluid can be scavenged from the cavities by appropriate lubrication pump means, said passage means being of restricted dimensions to provide a positive inlet pressure to prevent backflow from the collecting cavity into the gear chamber at all attitudes.

11. The self-scavenging gear box lubrication system of claim 10, including stripper means at the entrance to the passage means from the gear chamber for directing the lubricating fluid from the chamber into the passage means.

12. The self-scavenging gear box lubrication system of claim 10 wherein said collecting cavities substantially surround the gear chamber.

13. The self-scavenging gear box lubrication system of claim 12, including fluid conduit means interconnecting at least some of the collecting cavities.

14. The self-scavenging gear box lubrication system of claim 13 wherein said conduit means include a plurality of conduits spaced angularly about the gear chamber.

15. The self-scavenging gear box lubrication system of claim 10, including at least one collecting cavity on each opposite side of the gear chamber.

16. The self-scavenging gear box lubrication system of claim 10, including fluid conduit means interconnecting at least some of the collecting cavities.

17. The self-scavenging gear box lubrication system of claim 10, including fluid conduit means connecting all the collecting cavities whereby the pump means can be connected to only one of said cavities.

* * * * *